United States Patent
Kawaguchi et al.

(10) Patent No.: US 9,291,771 B2
(45) Date of Patent: Mar. 22, 2016

(54) OPTICAL FIBER

(71) Applicant: SUMITOMO ELECTRIC INDUSTRIES, LTD., Osaka-shi, Osaka (JP)

(72) Inventors: Yuki Kawaguchi, Yokohama (JP); Yoshinori Yamamoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/618,165

(22) Filed: Feb. 10, 2015

(65) Prior Publication Data

US 2015/0226915 A1  Aug. 13, 2015

(30) Foreign Application Priority Data

Feb. 12, 2014  (JP) .................. 2014-024168

(51) Int. Cl.
  *G02B 6/028* (2006.01)
  *G02B 6/036* (2006.01)
  *G02B 6/02* (2006.01)

(52) U.S. Cl.
  CPC ........ *G02B 6/03627* (2013.01); *G02B 6/02019* (2013.01); *G02B 6/03611* (2013.01)

(58) Field of Classification Search
  CPC .. G02B 6/02042; G02B 6/028; G02B 6/0288; G02B 6/0281; G02B 6/0283; G02B 6/0285; G02B 6/0286; G02B 6/03627
  USPC .......................................... 385/124, 126–128
  See application file for complete search history.

(56) References Cited

U.S. PATENT DOCUMENTS

| | | | |
|---|---|---|---|
| 8,655,133 B2 | 2/2014 | Yamamoto et al. | |
| 2009/0123122 A1 | 5/2009 | Mukasa | |
| 2009/0263091 A1* | 10/2009 | Kumano | 385/127 |
| 2011/0122644 A1* | 5/2011 | Okuno | 362/553 |
| 2014/0161404 A1* | 6/2014 | Fini | 385/126 |

FOREIGN PATENT DOCUMENTS

| | | |
|---|---|---|
| JP | 2003-262752 A | 9/2003 |
| JP | 2011-197667 A | 10/2011 |

* cited by examiner

*Primary Examiner* — Kaveh C Kianni
*Assistant Examiner* — Hung Lam
(74) *Attorney, Agent, or Firm* — Drinker Biddle & Reath LLP

(57) ABSTRACT

Provided is an optical fiber having a W-type refractive-index profile and having a reduced bend loss at a practically used bend radius. The optical fiber of the invention comprises: a core; an inner cladding enclosing the core and having a refractive index smaller than the refractive index of the core; and an outer cladding enclosing the inner cladding and having a refractive index which is smaller than the refractive index of the core and larger than the refractive index of the inner cladding, whereas the bend radius Rt is 25 mm or less when $$\frac{d\alpha(R)}{dR}$$

is the minimum, the bend loss at the bend radius R being $\alpha(R)$.

13 Claims, 5 Drawing Sheets

OPTICAL FIBER

FIELD OF THE INVENTION

The present invention relates to an optical fiber.

BACKGROUND ART

In order to improve the signal-to-noise ratio (SN ratio) in an optical transmission system, an optical fiber is required to have low attenuation and low nonlinearity. To reduce the nonlinearity of an optical fiber, it is effective to enlarge the effective area of the optical fiber. However, if the diameter of a core is enlarged in order to expand the effective area of the optical fiber, a higher order mode will be propagated. Therefore, in order to prevent signal degradation due to interference between propagation modes, the effective cutoff wavelength of LP11 mode of an optical fiber is needed to be not more than the signal light wavelength, that is, 1530 nm or less in the case where signal light is transmitted in the C-band (1530 to 1565 nm), for example.

W-type refractive-index profile is known as a refractive-index profile of an optical fiber which can not only expand an effective area but also make a single mode effectively at the wavelength of 1530 nm or more. The optical fiber having a W-type refractive-index profile has a core, an inner cladding which encloses the core and which has a refractive index smaller than the refractive index of the core, and an outer cladding which encloses the inner cladding and which has a refractive index smaller than the refractive index of the core and larger than the refractive index of the inner cladding.

When actually using an optical fiber, it is necessary to bend and store the excess length of the optical fiber in a repeater, transceiving equipment, a cable joint box, and the like. In such case, the bend radius is about 25 mm, for example.

In the past, however, in most cases the bend loss of an optical fiber has been discussed at the value in terms of bend loss available with a bend radius of 10 mm, and there has been little examination for bend loss in the case of a bend radius in which an optical fiber is actually used. For example, Japanese Patent Application Laid-Open No. 2011-197667 proposes a design method for refractive-index profile of an optical fiber in order to reduce the bend loss at a bend radius of 10 mm, although no investigation has been done with respect to the bend radius of 25 mm, for example, in which an optical fiber is actually used.

SUMMARY OF THE INVENTION

Object of the Invention

An object of the present invention is to provide an optical fiber having a W-type refractive-index profile in which the bend loss at a practically used bend radius can be reduced.

Means for Achieving the Object

In order to solve the object, an optical fiber of the invention comprises: a core including the central axis, an inner cladding enclosing the core and having a refractive index smaller than a refractive index of the core, and an outer cladding enclosing the inner cladding and having a refractive index which is smaller than the refractive index of the core and larger than the refractive index of the inner cladding, wherein the optical fiber has a bend loss $\alpha(R)$ at a bend radius R and $$\frac{d\alpha(R)}{dR}$$

becomes minimum at the bend radius of 25 mm or less.

The optical fiber of the present invention may have an effective area of 110 $\mu m^2$ or more and 170 $\mu m^2$ or less, and have a cutoff wavelength of 1600 nm or less. The effective area preferably be 110 $\mu m^2$ or more and 160 $\mu m^2$ or less, and more preferably, be 120 $\mu m^2$ or more and 140 $\mu m^2$ or less. In these cases, the cutoff wavelength may be 1500 nm or less. Here, the cutoff wavelength is the fiber cutoff wavelength defined in ITU-T G.650.1.

In an optical fiber of the present invention, regarding a radius "a" of the core and an outside radius "b" of the inner cladding, a ratio b/a may be 2.0 or more and 4.5 or less, and a relative refractive index difference of the outer cladding relative to the inner cladding, $\Delta 2=100\times(n3-n2)/n3$ [%], may be 0.01% or more and 0.15% or less. In such case, the core may have a diameter of 12.0 $\mu m$ or more and 15.5 $\mu m$ or less, and a relative refractive index difference of the core relative to the inner cladding, $\Delta 1=100\times(n1-n2)/n1$ [%], may be 0.25% or more and 0.35% or less. Preferably, the diameter be 12.0 $\mu m$ or more and 14.5 $\mu m$ or less, and the relative refractive index difference $\Delta 1$ be 0.25% or more and 0.35% or less.

In the optical fiber of the present invention, the core may have a depressed portion existing at the center of the core and having a refractive index lower than that of a circumference of the depressed portion. In such case, the core may have a diameter of 12.0 $\mu m$ or more and 15.5 $\mu m$ or less, and regarding a radius "d" of the depressed portion, a ratio a/d may be 2.2 or more and 4.0 or less, and the depressed portion may have a refractive-index depth, $\Delta 1'=100\times(n1-n0)/n1$ [%], of 0.01% or more and 0.15% or less. Preferably, the diameter be 12.0 $\mu m$ or more and 14.0 $\mu m$ or less, the ratio a/d be 2.2 or more and 4.0 or less, and the refractive-index depth be 0.01% or more and 0.15% or less.

Another aspect of the invention is an optical fiber transmission line which is equipped with an optical fiber of the present invention as an optical transmission line.

Effect of the Invention

According to the present invention, it is possible to provide an optical fiber having a W-type refractive-index profile in which the bend loss at an actually used bend radius is reduced.

DETAILED DESCRIPTION OF THE INVENTION

Hereafter, with reference to accompanying drawings, examples for carrying out the present invention will be described in detail. The present invention is not limited to the examples and is shown by the claims, including all modifications equivalent to or within the scope of a claim.

Figure 1:
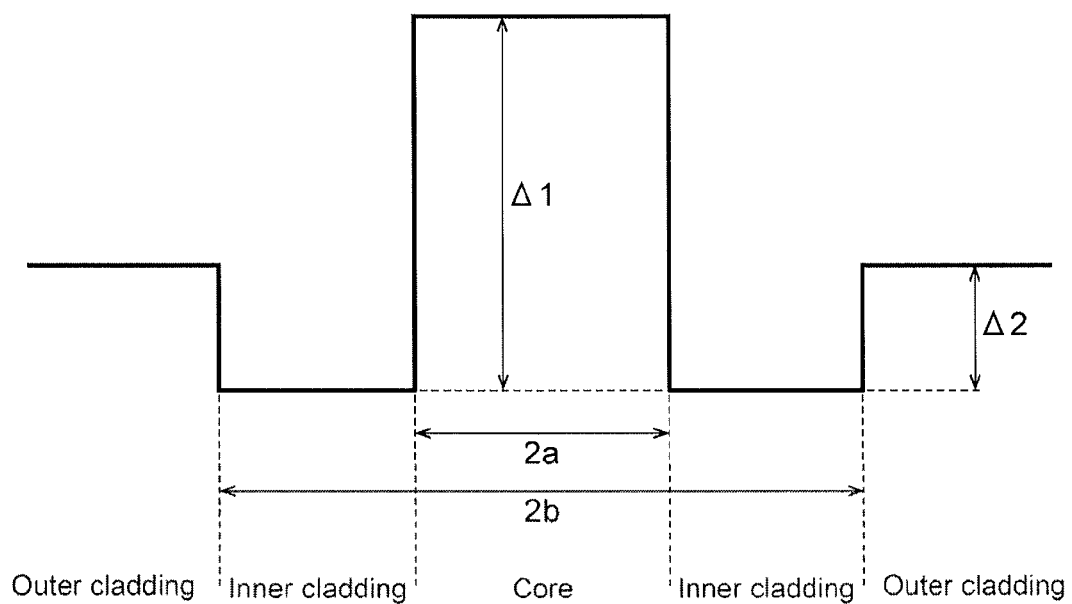
FIG. 1 is a schematic diagram showing a refractive-index profile of an optical fiber according to an embodiment of the present invention.

FIG. 1 is a schematic diagram showing the refractive-index profile of an optical fiber according to an embodiment of the present invention. The optical fiber has a W-type refractive-index profile. That is, the optical fiber has a core, an inner cladding enclosing the core, and an outer cladding enclosing the inner cladding. The refractive index n2 of the inner cladding is smaller than the refractive index n1 of the core. The refractive index n3 of the outer cladding is smaller than the refractive index n1 of the core and larger than the refractive index n2 of the inner cladding. The optical fiber is made of silica glass and refractive-index modifying dopants are added to the respective regions as needed. Let "a" be a core radius and "b" be an outside radius of the inner cladding. On the basis of the refractive index of the inner cladding, the relative refractive index difference of the core is expressed as $\Delta 1=100\times(n1-n2)/n1$ [%], and the relative refractive index difference of the outer cladding is expressed as $\Delta 2=100\times(n3-n2)/n3$ [%].

Figure 2:
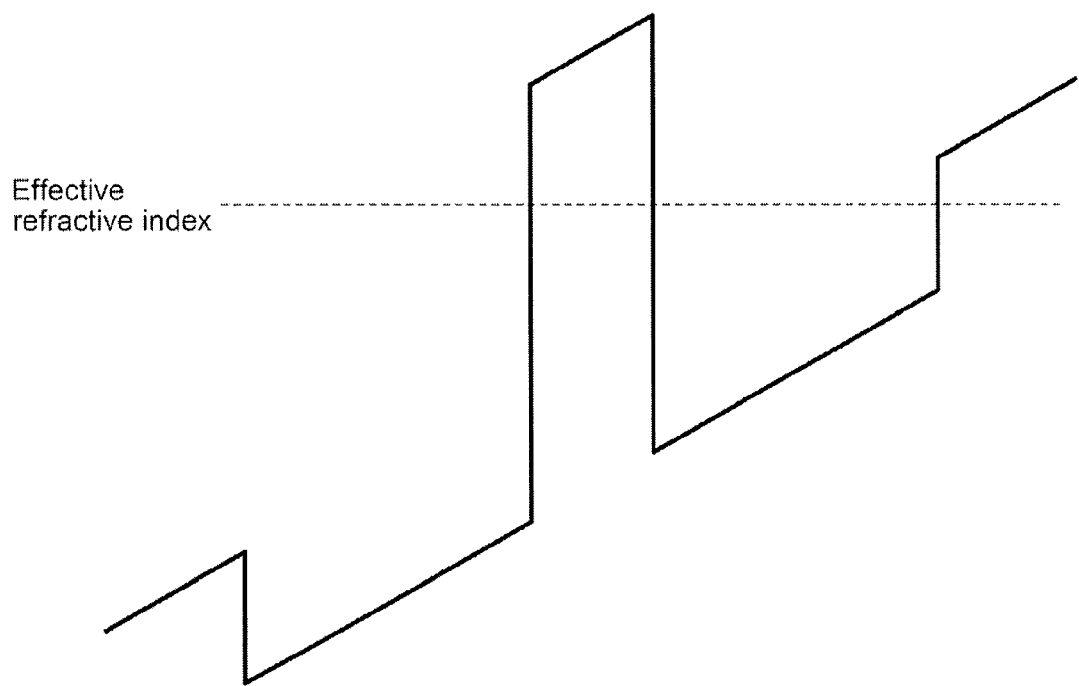
FIG. 2 is a schematic diagram showing an equivalent refractive-index profile of a bent optical fiber.

FIG. 2 is a schematic diagram showing an equivalent refractive-index profile of a bent optical fiber. If an optical fiber is bent, the equivalent refractive-index profile of the optical fiber has an inclination that is proportional to the reciprocal of the bend radius from the bend center toward the outside such that the equivalent refractive-index of the cladding becomes higher as the position thereof is located on the more outer side of the radius position. On the outside of the radius position at which the equivalent refractive index of the cladding is equal to the effective refractive index of LP01 mode, the light of LP01 mode leaks causing a bend loss.

The optical fiber having a W-type refractive-index profile has an inner cladding and an outer cladding. In a case where the bend radius is small, the equivalent refractive-index becomes equal to the effective refractive index of the LP01 mode in the region of the inner cladding. When the bend radius becomes larger, the equivalent refractive-index becomes equal to the effective refractive index of the LP01 mode at the interface between the inner cladding and the outer cladding. Furthermore, when the bend radius becomes further larger, the equivalent refractive-index becomes equal to the effective refractive index of the LP01 mode in the region of the outer cladding. The optical fiber having a W-type refractive-index profile will exhibit significant change of bend-loss characteristics at a boundary of the bend radius at which the effective refractive index of the LP01 mode and the equivalent refractive index of the outer cladding become equal.

Figure 3:
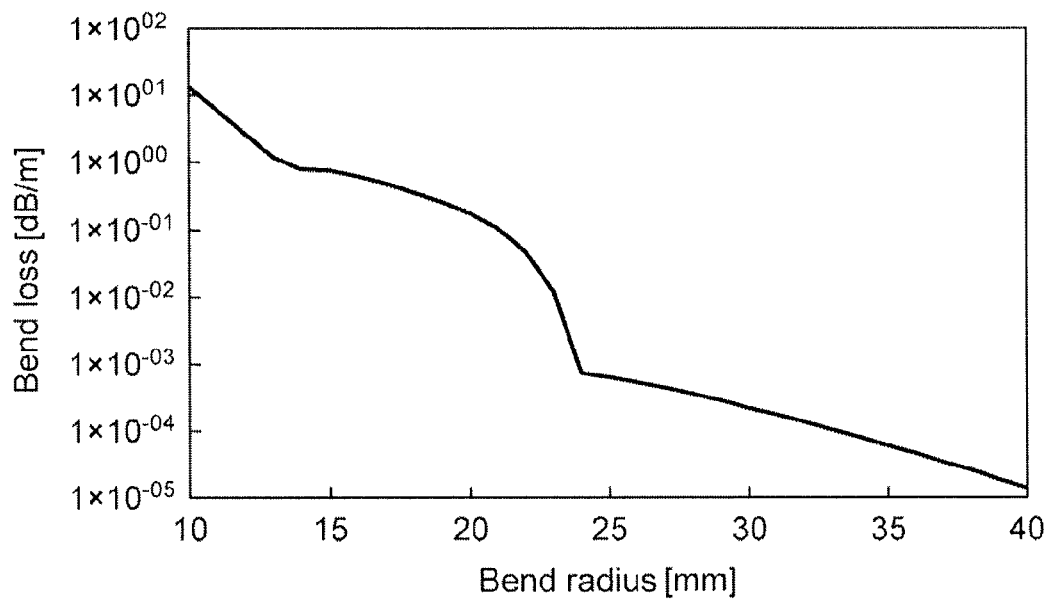
FIG. 3 is a graph showing a relationship between a bend radius and the bend loss of an optical fiber having a W-type refractive-index profile.

FIG. 3 is a graph showing a relationship between a bend radius and a bend loss at a wavelength of 1550 nm of an optical fiber having a W-type refractive-index profile. Here, the core diameter 2a was set to 12.8 μm, the ratio b/a between the core radius and the outside radius of the inner cladding was set to 3.6, and on the basis of the refractive index of the inner cladding, the relative refractive index difference $\Delta 1$ of the core was set to 0.29%, and the relative refractive index difference $\Delta 2$ of the outer cladding was set to 0.07%. The bend-loss characteristics change by about double digits at the boundary of 24 mm in bend radius.

Figure 4:
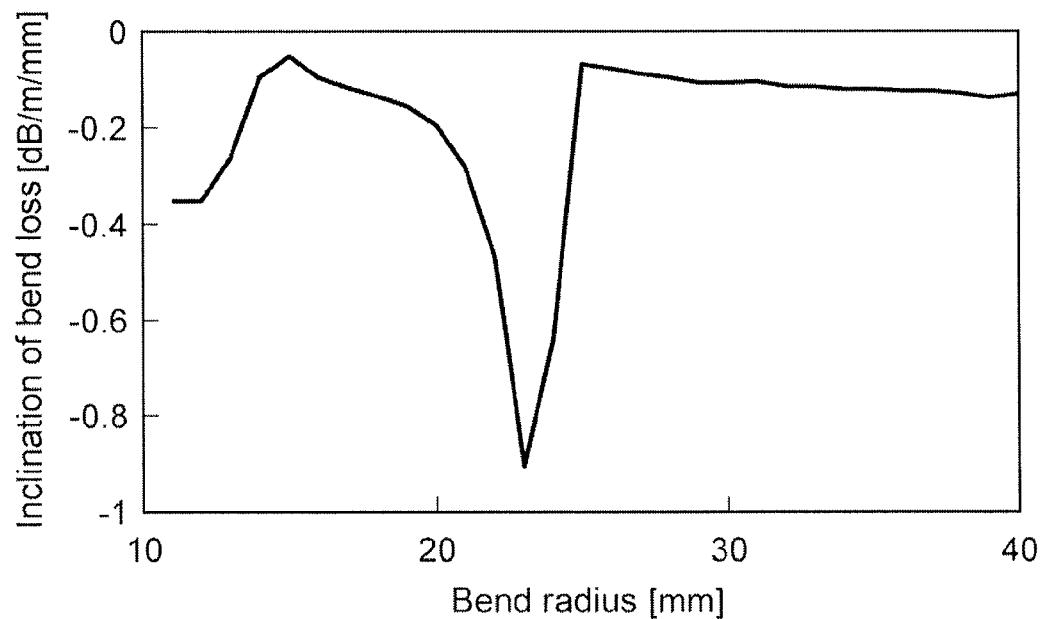
FIG. 4 is a graph showing a relationship between a bend radius and the first-order deviation of bend loss with respect to the bend radius of an optical fiber having a W-type refractive-index profile.

FIG. 4 is a graph showing a relationship between a bend radius and the first-order deviation of bend loss with respect to the bend radius at the wavelength of 1550 nm of an optical fiber having a W-type refractive-index profile. The vertical axis expresses $$\frac{d\alpha(R)}{dR},$$

where $\alpha(R)$ [dB/m] is a bend loss at the bend radius R [mm]. The bend radius Rt at which $$\frac{d\alpha(R)}{dR}$$

becomes the minimum is 24 mm. The radius Rt is determined by the relation between the effective refractive index of the fundamental mode and the equivalent refractive-index profile. Therefore, by appropriately designing the structure of an optical fiber, it is made possible to reduce Rt to equal to or less than a bend radius which is actually used and to decrease the bend loss at the actually used bend radius.

The effective refractive index of LP01 mode of an optical fiber is determined by the refractive-index profile of the optical fiber. It is suitable to set b/a to 4.5 or less, because if b/a is made smaller, Rt can be made smaller since the interface between the inner cladding and the outer cladding becomes closer to the center core, thereby lessening the bend radius at which the effective refractive index of LP01 mode and the equivalent refractive index of the outer cladding become equal. Also, it is preferable to set $\Delta 2$ to 0.15% or less, since Rt can be similarly made smaller by lessening the refractive-index difference between the inner cladding and the outer cladding.

Table I summarizes the profile parameters and characteristic values of optical fibers of Examples 1 to 18, and shows core diameter 2a, ratio b/a between core radius and outside radius of inner cladding, on the basis of the refractive index of the inner cladding, relative refractive index difference $\Delta 1$ of a core, relative refractive index difference $\Delta 2$ of outer cladding, effective area Aeff at the wavelength of 1550 nm, cutoff wavelength $\lambda_c$, Rt, bend loss $\alpha_{b10}$ at the wavelength of 1550 nm at the bend radius of 10 mm, and bend loss $\alpha_{b25}$ at the wavelength of 1550 nm at the bend radius of 25 mm. These optical fibers have the refractive-index profile shown in FIG. 1, and Rt is 25 mm or less.

TABLE I

|  | 2a μm | Δ1 % | b/a | Δ2 % | Aeff μm² | $\lambda_c$ nm | Rt mm | $\alpha_{b10}$ dB/m | $\alpha_{b25}$ dB/m |
|---|---|---|---|---|---|---|---|---|---|
| Example 1 | 12.0 | 0.31 | 2.5 | 0.11 | 117 | 1272 | 20 | 33.32 | 0.040 |
| Example 2 | 12.0 | 0.35 | 4.5 | 0.09 | 112 | 1520 | 22 | 0.71 | 0.000 |
| Example 3 | 12.2 | 0.25 | 4.4 | 0.01 | 133 | 1532 | 24 | 87.11 | 0.000 |

TABLE I-continued

| | 2a μm | Δ1 % | b/a | Δ2 % | Aeff μm² | $\lambda_c$ nm | Rt mm | $\alpha_{b10}$ dB/m | $\alpha_{b25}$ dB/m |
|---|---|---|---|---|---|---|---|---|---|
| Example 4 | 12.6 | 0.28 | 3.4 | 0.05 | 131 | 1496 | 22 | 32.61 | 0.002 |
| Example 5 | 12.8 | 0.29 | 3.6 | 0.07 | 130 | 1505 | 24 | 13.45 | 0.001 |
| Example 6 | 13.4 | 0.33 | 3.0 | 0.12 | 132 | 1492 | 22 | 2.20 | 0.001 |
| Example 7 | 12.0 | 0.25 | 4.0 | 0.03 | 130 | 1449 | 24 | 94.81 | 0.001 |
| Example 8 | 12.6 | 0.28 | 3.4 | 0.06 | 130 | 1431 | 24 | 34.80 | 0.003 |
| Example 9 | 13.2 | 0.32 | 3.0 | 0.12 | 134 | 1446 | 24 | 2.63 | 0.004 |
| Example 10 | 12.0 | 0.25 | 3.8 | 0.04 | 131 | 1390 | 24 | 94.73 | 0.003 |
| Example 11 | 12.6 | 0.28 | 3.0 | 0.08 | 130 | 1402 | 24 | 21.95 | 0.014 |
| Example 12 | 13.0 | 0.30 | 3.0 | 0.11 | 132 | 1409 | 25 | 7.50 | 0.008 |
| Example 13 | 12.0 | 0.30 | 3.0 | 0.04 | 130 | 1401 | 20 | 94.63 | 0.030 |
| Example 14 | 13.0 | 0.22 | 3.4 | 0.03 | 151 | 1448 | 25 | 204.20 | 0.010 |
| Example 15 | 13.6 | 0.25 | 3.0 | 0.06 | 153 | 1450 | 25 | 69.44 | 0.013 |
| Example 16 | 14.5 | 0.29 | 3.5 | 0.06 | 151 | 1550 | 22 | 7.12 | 0.000 |
| Example 17 | 15.1 | 0.27 | 3.5 | 0.10 | 162 | 1496 | 24 | 19.81 | 0.000 |
| Example 18 | 15.5 | 0.26 | 3.0 | 0.06 | 173 | 1490 | 23 | 19.20 | 0.008 |

Figure 5:
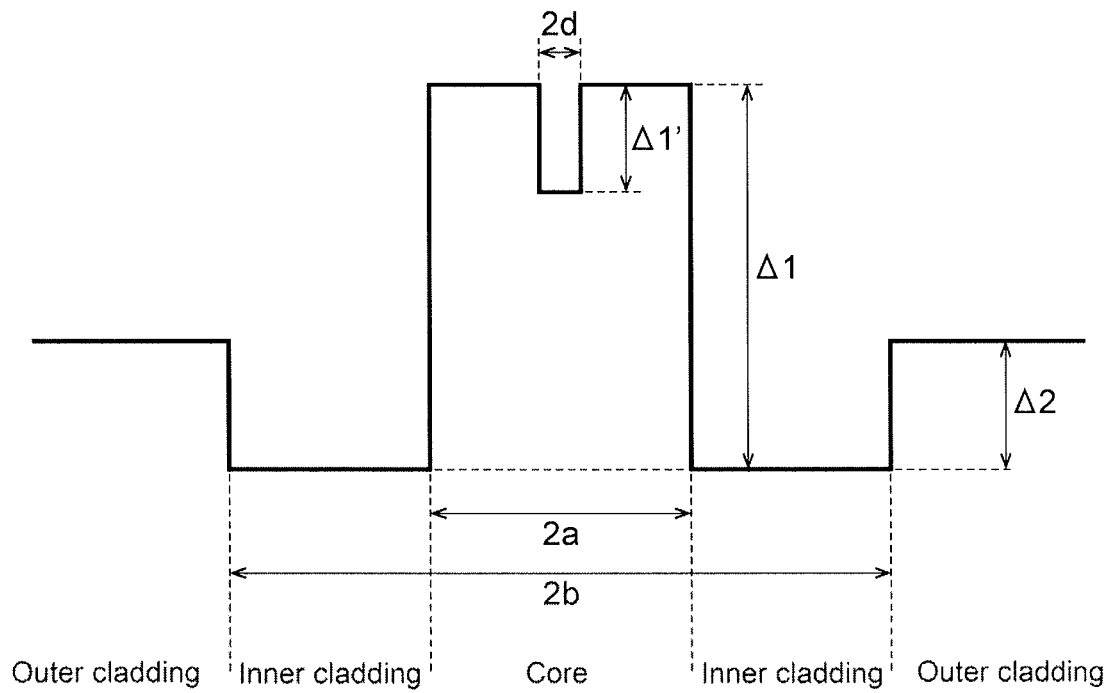
FIG. 5 is a schematic diagram showing a refractive-index profile of a modification example of an optical fiber according to the embodiment of the present invention.

FIG. 5 is a schematic diagram showing a refractive-index profile of a modification example of an optical fiber according to the embodiment of the present invention. This optical fiber also has a W-type refractive-index profile and has, at the center of the core, a depressed portion having a refractive index n0 which is lower than the circumference thereof. Let "d" be the radius of the depressed portion and the relative refractive index difference of the core relative to the depressed portion is expressed as Δ1'=100×(n1−n0)/n1 [%].

Table II summarizes the profile parameters and characteristic values of optical fibers of Examples 21 to 38, and shows core diameter 2a, relative refractive index difference Δ1' of a depressed portion, relative refractive index difference Δ1 of a core, ratio a/d between core radius and radius of the depressed portion, ratio b/a between the core radius and the radius of an inner cladding, relative refractive index difference Δ2 of an outer cladding, effective area Aeff at the wavelength of 1550 nm, cutoff wavelength $\lambda_c$, Rt, bend loss $\alpha_{b10}$ at the wavelength of 1550 nm at the bend radius of 10 mm, and bend loss $\alpha_{b25}$ at the wavelength of 1550 nm at the bend radius of 25 mm. These optical fibers have the refractive-index profile shown in FIG. 5, and Rt is 25 mm or less.

TABLE II

| | 2a μm | Δ1' % | Δ1 % | d/a | b/a | Δ2 % | Aeff μm² | $\lambda_c$ nm | Rt mm | $\alpha_{b10}$ dB/m | $\alpha_{b25}$ dB/m |
|---|---|---|---|---|---|---|---|---|---|---|---|
| Example 21 | 12.0 | 0.10 | 0.27 | 3.0 | 2.5 | 0.11 | 118 | 1309 | 20 | 36.20 | 0.052 |
| Example 22 | 12.0 | 0.08 | 0.32 | 3.2 | 4.5 | 0.09 | 112 | 1512 | 22 | 1.94 | 0.002 |
| Example 23 | 12.2 | 0.13 | 0.30 | 2.8 | 4.2 | 0.01 | 136 | 1521 | 22 | 85.01 | 0.000 |
| Example 24 | 12.6 | 0.05 | 0.29 | 3.5 | 3.4 | 0.05 | 131 | 1490 | 22 | 30.16 | 0.001 |
| Example 25 | 12.8 | 0.15 | 0.33 | 4.0 | 3.6 | 0.07 | 130 | 1507 | 24 | 15.21 | 0.002 |
| Example 26 | 13.4 | 0.10 | 0.36 | 3.1 | 3.0 | 0.12 | 131 | 1486 | 22 | 3.20 | 0.000 |
| Example 27 | 12.0 | 0.16 | 0.27 | 4.5 | 4.0 | 0.03 | 136 | 1452 | 24 | 94.81 | 0.000 |
| Example 28 | 12.6 | 0.02 | 0.29 | 2.5 | 3.4 | 0.06 | 130 | 1430 | 24 | 34.80 | 0.002 |
| Example 29 | 13.2 | 0.04 | 0.38 | 3.0 | 3.0 | 0.12 | 139 | 1462 | 24 | 2.63 | 0.001 |
| Example 30 | 12.0 | 0.10 | 0.28 | 3.0 | 3.8 | 0.04 | 128 | 1396 | 24 | 94.73 | 0.002 |
| Example 31 | 12.6 | 0.11 | 0.31 | 3.4 | 3.0 | 0.08 | 130 | 1402 | 24 | 20.04 | 0.012 |
| Example 32 | 13.0 | 0.08 | 0.34 | 2.2 | 3.0 | 0.11 | 132 | 1409 | 25 | 6.31 | 0.015 |
| Example 33 | 12.0 | 0.02 | 0.30 | 3.4 | 3.0 | 0.04 | 135 | 1401 | 20 | 90.10 | 0.042 |
| Example 34 | 13.0 | 0.06 | 0.24 | 3.0 | 3.4 | 0.03 | 151 | 1448 | 25 | 206.45 | 0.016 |
| Example 35 | 13.6 | 0.10 | 0.28 | 3.4 | 3.0 | 0.06 | 153 | 1450 | 25 | 67.18 | 0.013 |
| Example 36 | 13.2 | 0.11 | 0.34 | 3.0 | 3.5 | 0.10 | 152 | 1522 | 24 | 21.5 | 0.024 |
| Example 37 | 15.0 | 0.09 | 0.30 | 3.0 | 3.5 | 0.10 | 162 | 1498 | 24 | 19.21 | 0.021 |
| Example 38 | 15.3 | 0.15 | 0.31 | 3.0 | 3.0 | 0.06 | 173 | 1497 | 23 | 19.66 | 0.008 |

Figure 6:
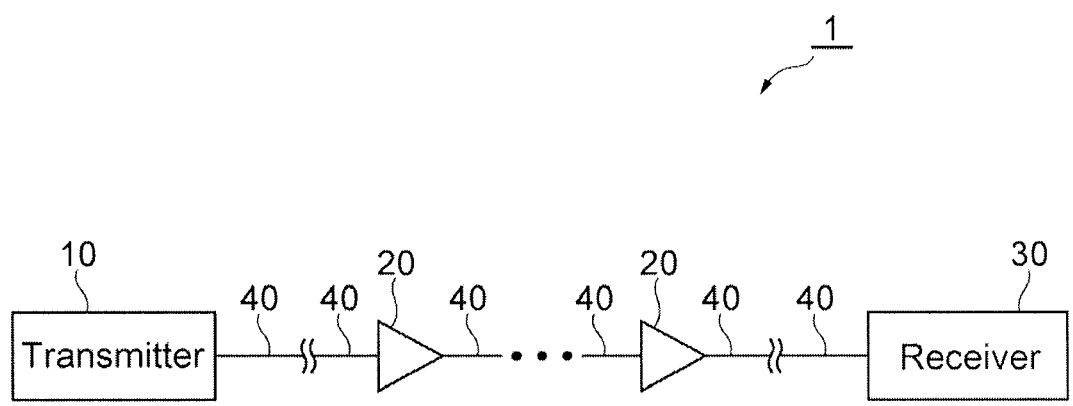
FIG. 6 is a schematic diagram showing an optical transmission system equipped with optical fibers of the present invention.

FIG. 6 is a schematic diagram showing an optical transmission system 1 equipped with optical fibers of the present invention. The optical transmission system 1 transmits signal light to a receiver 30 through repeaters 20 from a transmitter 10. Optical fiber transmission lines 40 using optical fibers of the present invention for a transmission line are installed between the transmitter 10 and the repeater 20 of the first stage, between a repeater 20 and a repeater 20 of the following stage, and between the repeater 20 of the last stage and the receiver 30. In this optical transmission system 1, the bend loss at actually used bend radius is reduced and signal light can be transmitted at a low loss and low nonlinearity, since the transmission lines thereof are optical fiber transmission lines 40 using optical fibers having W-type refractive-index profile in which Rt is 25 mm or less.

In order to reduce the nonlinearity of an optical fiber, it is effective to enlarge an effective area. However, when the effective area becomes large, in the case where optical fibers in which the effective area is thus enlarged are connected with optical fibers which are already installed as an optical transmission line or used in a transmission apparatus, such as ordinary single-mode fibers based on ITU-T G.652 series, dispersion shift fibers based on ITU-T G.653 series, nonzero dispersion shift fibers based on the ITU-T G.655 and G.656 series, the connection loss may become large, and as a result OSNR may become low. Therefore, it is suitable that the effective area at the wavelength of 1550 nm be 110 μm² or more and 160 μm² or less. The cutoff wavelength is preferably 1600 nm or less. This will enable guarantee for effective single mode transmission at the wavelength of 1530 nm or more. The effective area is preferably 120 μm² or more and 140 μm² or less (Examples 3 to 13, and Examples 23 to 32), and the cutoff wavelength is preferably 1500 nm or less (Example 1, Examples 4 to 15, Example 21, and Examples 24 to 35).

What is claimed is:

1. An optical fiber comprising:
   a core including a central axis;
   an inner cladding enclosing the core and having a refractive index smaller than that of the core; and
   an outer cladding enclosing the inner cladding and having a refractive index smaller than that of the core and larger than that of the inner cladding, wherein
   the optical fiber has a bend loss $\alpha(R)$ at a bend radius R and $$\frac{d\alpha(R)}{dR}$$

having minimum at the bend radius in the range of 10 mm or more and 25 mm or less.

2. The optical fiber according to claim 1, wherein the optical fiber has an effective area of 110 µm² or more and 170 µm² or less, and has a cutoff wavelength of 1600 nm or less.

3. The optical fiber according to claim 2, wherein the effective area is 110 µm² or more and 160 µm² or less.

4. The optical fiber according to claim 3, wherein the effective area is 120 µm² or more and 140 µm² or less.

5. The optical fiber according to claim 2, wherein the cutoff wavelength is 1500 nm or less.

6. The optical fiber according to claim 1, wherein the core has a radius a, the inner cladding has an outside radius b, and a ratio b/a is 2.0 or more and 4.5 or less, and a relative refractive index difference of the outer cladding relative to the inner cladding is 0.01% or more and 0.15% or less.

7. The optical fiber according to claim 6, wherein the core has a diameter of 12.0 µm or more and 15.5 µm or less, and a relative refractive index difference of the core relative to the inner cladding is 0.25% or more and 0.35% or less.

8. The optical fiber according to claim 7, wherein the diameter is 12.0 µm or more and 14.5 µm or less.

9. The optical fiber according to claim 6, wherein the core has a depressed portion existing at the center thereof and having a refractive index lower than that of a circumference thereof.

10. The optical fiber according to claim 9, wherein the core has a diameter of 12.0 µm or more and 15.5 µm or less, the depressed portion having a radius d and a ratio a/d is 2.2 or more and 4.0 or less, and the depressed portion has a refractive-index depth of 0.01% or more and 0.15% or less.

11. The optical fiber according to claim 10, wherein the diameter is 12.0 µm or more and 14.0 µm or less.

12. An optical fiber transmission line equipped with optical fibers according to claim 1.

13. An optical fiber comprising:
    a core including a central axis;
    an inner cladding enclosing the core and having a refractive index smaller than that of the core; and
    an outer cladding enclosing the inner cladding and having a refractive index smaller than that of the core and larger than that of the inner cladding, wherein
    the optical fiber has a bend loss $\alpha(R)$ at a bend radius R and $$\frac{d\alpha(R)}{dR}$$

having a minimum of −0.9 at the bend radius of 24 mm.

* * * * *